United States Patent
Tsirkin

(10) Patent No.: US 11,656,891 B2
(45) Date of Patent: May 23, 2023

(54) COPY-ON-WRITE FOR VIRTUAL MACHINES WITH ENCRYPTED STORAGE

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 200 days.

(21) Appl. No.: 16/585,228

(22) Filed: Sep. 27, 2019

(65) Prior Publication Data

US 2021/0096898 A1   Apr. 1, 2021

(51) Int. Cl.
*G06F 9/455* (2018.01)

(52) U.S. Cl.
CPC .......... *G06F 9/45558* (2013.01); *G06F 2009/45579* (2013.01); *G06F 2009/45587* (2013.01)

(58) Field of Classification Search
None
See application file for complete search history.

(56) References Cited

U.S. PATENT DOCUMENTS

| | | |
|---|---|---|
| 8,706,947 B1 | 4/2014 | Pradeep |
| 8,856,544 B2 | 10/2014 | Bosch et al. |
| 8,977,842 B1 | 3/2015 | McCorkendale et al. |
| 9,069,477 B1 * | 6/2015 | Overton .......... G06F 12/00 |
| 9,176,889 B1 | 11/2015 | Earhart, III |
| 9,215,066 B2 | 12/2015 | Moffat et al. |
| 9,652,634 B2 | 5/2017 | Wang et al. |
| 9,798,486 B1 * | 10/2017 | Singh .......... G06F 11/1453 |
| 9,940,060 B1 | 4/2018 | Colgrove et al. |
| 10,152,234 B1 | 12/2018 | Martin et al. |
| 10,404,674 B1 | 9/2019 | Bshara et al. |
| 2009/0182789 A1 | 7/2009 | Sandorfi et al. |
| 2015/0242159 A1 * | 8/2015 | Tsirkin .......... G06F 3/0647 711/162 |

(Continued)

FOREIGN PATENT DOCUMENTS

| | | |
|---|---|---|
| CN | 101976202 | 2/2014 |
| WO | 2015043376 | 4/2015 |
| WO | 2018182772 | 10/2018 |

OTHER PUBLICATIONS

Fischer et al., "On the Detection of Applications in Co-Resident Virtual Machines via a Memory Deduplication Side-Channel", 2018, Department of Computer Science University of Hamburg, Germany, https://svs.informatik.uni-hamburg.de/publications/2018/2018-12-Lindemann-Application-Detection.pdf, 15 pages.

(Continued)

*Primary Examiner* — Lewis A Bullock, Jr.
*Assistant Examiner* — Melissa A Headly
(74) *Attorney, Agent, or Firm* — Lowenstein Sandler LLP

(57) ABSTRACT

Technology for enabling a hypervisor to perform copy on write features on encrypted storage of a virtual machine. An example method may involve: receiving, by a guest program from a hypervisor, an indication that identifies a first storage block of a first virtual machine, wherein the first storage block is write protected by the hypervisor; identifying, by the guest program, a second storage block of a second virtual machine; and copying, by the guest program, data of the first storage block to the second storage block, wherein the data of the first storage block and data of the second storage block are encrypted using different cryptographic inputs.

16 Claims, 8 Drawing Sheets

(56) References Cited

U.S. PATENT DOCUMENTS

| | | |
|---|---|---|
| 2015/0381589 A1* | 12/2015 | Tarasuk-Levin .... G06F 9/45558 |
| | | 713/193 |
| 2016/0328257 A1* | 11/2016 | Hudzia ............... G06F 9/45558 |
| 2016/0359622 A1 | 12/2016 | Bunch et al. |
| 2017/0123710 A1 | 5/2017 | Fisher |
| 2017/0169233 A1 | 6/2017 | Hsu et al. |
| 2017/0277898 A1* | 9/2017 | Powell .................... G06F 21/53 |
| 2018/0032447 A1 | 2/2018 | Kaplan et al. |
| 2018/0239772 A1 | 8/2018 | Vijayan |
| 2018/0276145 A1 | 9/2018 | Tsirkin et al. |
| 2019/0026476 A1 | 1/2019 | Van Riel |
| 2019/0068557 A1 | 2/2019 | Noel et al. |
| 2019/0179538 A1 | 6/2019 | van Riel et al. |
| 2020/0004568 A1 | 1/2020 | Candido de Lima, Jr. et al. |
| 2020/0310972 A1 | 10/2020 | Shanbhogue et al. |

OTHER PUBLICATIONS

Jin et al., "H-SVM: Hardware-assisted Secure Virtual Machines under a Vulnerable Hypervisor", Jan. 9, 2015, IEEE, https://ieeexplore.ieee.org/abstract/document/7005439, 14 pages.

Hegarty, Steve, "Backup and De-duplication of Encrypted Data", Feb. 15, 2018, Dell EMC, https://stevehegarty.wordpress.com/2018/02/15/backup-and-de-duplication-of-encrypted-data/, 4 pages.

Xiao, Jidong et al., "Security Implications of Memory Deduplication in a Virtualized Environment", 2013, The College of William and Mary, 12 pages.

Ning et al, "Group-Based Memory Deduplication against Covert Channel Attacks in Virtualized Environments," 2016, Institute of Information Engineering, https://ieeexplore.ieee.org/document/7846946, 7 pages.

* cited by examiner

COPY-ON-WRITE FOR VIRTUAL MACHINES WITH ENCRYPTED STORAGE

TECHNICAL FIELD

The present disclosure is generally related to data storage management, and more particularly, to management of storage devices that provide hardware-level storage encryption.

BACKGROUND

Modern computer systems often provide support for a copy on write feature (CoW) to optimize resource consumption. The copy on write feature may be referred to as implicit sharing or shadowing and may be a resource-management technique used in computer programming to efficiently implement a "duplicate" or "copy" operation on modifiable resources. When a resource is duplicated but not modified, it is not necessary to have multiple different copies of it and a single copy can be shared between users (e.g., process thread or hardware adapter). However, if one of the users attempts to alter the single copy then another copy can be created and the alteration can be applied to one of the copies. This enables a single copy to exist and for the copy operation to be deferred to the first write. By sharing resources in this way, it is possible to significantly reduce the resource consumption of unmodified copies with a small overhead to resource-modifying operations.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
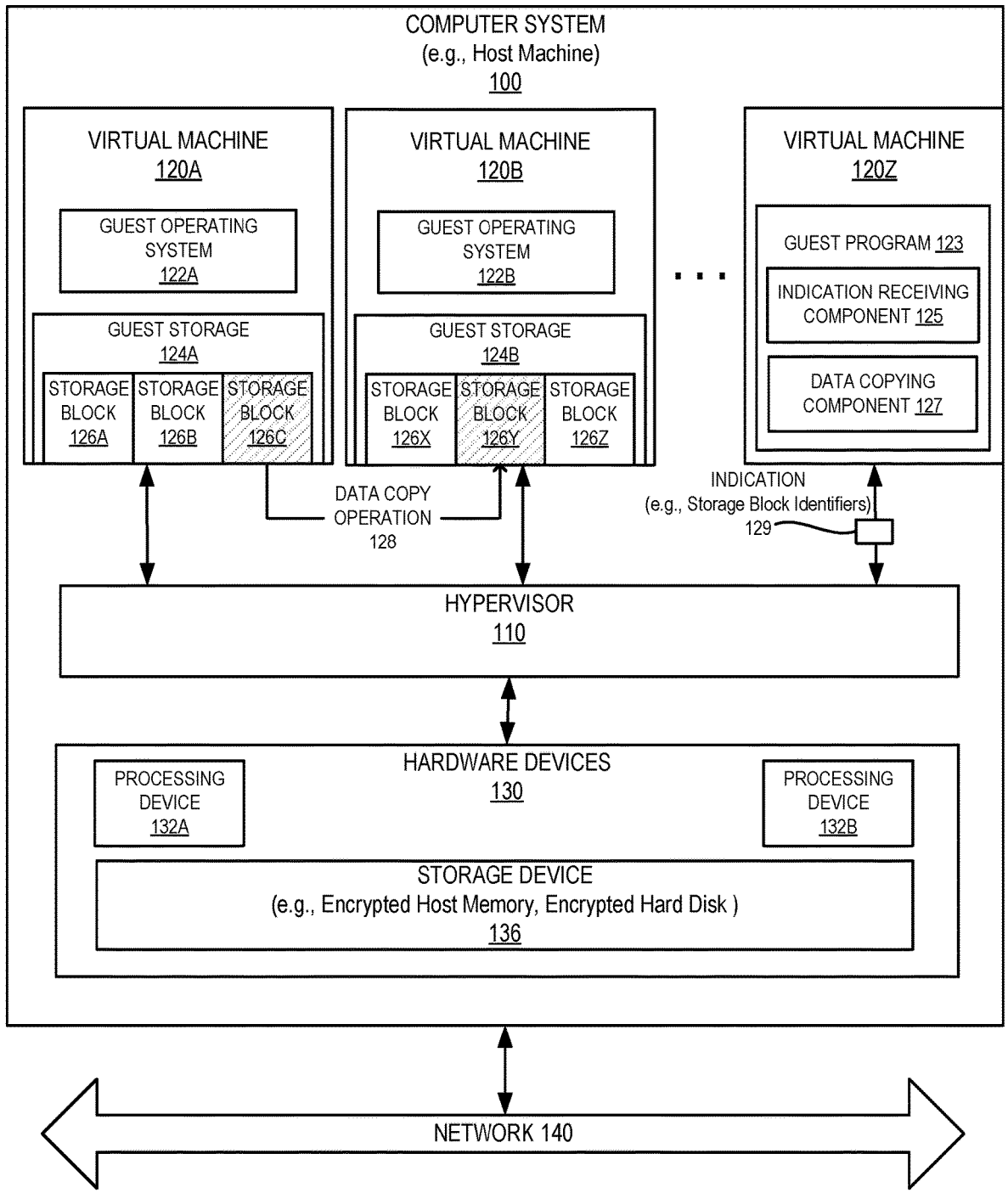
FIG. 1 depicts a high-level block diagram of an example computer system architecture that enables a hypervisor to use a guest program to perform copy on write features, in accordance with one or more aspects of the present disclosure.

Computer systems often use cryptographic functions to encrypt data stored within a storage device. The cryptographic functions may use variations in cryptographic input to enhance security and cause multiple instances of identical content to appear different once encrypted. Some cryptographic systems provide this variation by performing the encryption at a hardware level using a cryptographic key that is based on hardware embedded information of the data storage device (e.g., physical storage address). In a virtualized computer system, the hardware level encryption may encrypt storage of a virtual machine so that it is accessible by the virtual machine but inaccessible by the hypervisor or host operating system that supports the virtual machine. This may enhance security but may cause the storage of a virtual machine to become inaccessible when copied by the hypervisor. This may be problematic because the hypervisor may be responsible for copying or moving the data of one or more virtual machines to optimize access to the data. In the past, the hypervisor may be provided with the ability to decrypt the data so that the hypervisor could move the data within the data storage device, but this may present a security vulnerability.

Aspects of the present disclosure address the above and other deficiencies by providing technology that enables a hypervisor to provide copy on write features for encrypted storage blocks of a virtual machine without accessing a decrypted version of the data. In one example, the hypervisor may use a guest program to copy data between encrypted storage blocks of one or more virtual machines. The storage blocks may be any portion of data storage that is capable of storing data and may be based on volatile or non-volatile data storage devices. The data of the storage blocks may be encrypted by a cryptographic function that uses one or more cryptographic inputs (e.g., location based key and a shared key). The cryptographic function may be executed by the hardware and some or all of the cryptographic keys (e.g., decryption keys or encryption keys) may be concealed or temporarily hidden from the hypervisor, guest program, guest operating systems, or a combination thereof. The hardware may decrypt the data when a virtual machine attempts to access the data (e.g., guest program copies data) and may avoid decrypting the data when the hypervisor attempts to access the data (e.g., hypervisor copies data).

The guest program may be executed by a virtual machine and controlled by the hypervisor to copy data from a source storage block to one or more destination storage blocks. The guest program may receive, from the hypervisor, an indication that identifies the source storage block (e.g., a first storage block) and may identify a destination storage block (e.g., a second storage block). The source storage block may be write protected by the hypervisor and the destination storage block may recently allocated and mapped to the virtual machine executing the guest program. The guest program may copy data of the source storage block to the destination storage block and the data of the source and destination storage blocks may be encrypted using different cryptographic inputs. This may result in identical unencrypted content (e.g., same plaintext) being stored in the respective storage blocks as different encrypted content (e.g., different cipher text).

The guest program that performs the copy may be executed by a targeted virtual machine that is the target of a copy operation (e.g., VM affected by copy) or may be executed by an auxiliary virtual machine. The auxiliary virtual machine may or may not have storage that is affected by the copy operation and in one example may be a lean virtual machine. The lean virtual machine may have a reduced processing and storage footprint and may be dedicated to enabling the hypervisor to perform the copy on write features. The lean virtual machine may execute the guest program (e.g., guest kernel, guest driver, executable code, etc.) to perform tasks for the deduplication without having all of the features of a full guest operating system. In one example, the hypervisor may initiate or activate the virtual machine performing the copy in response to detecting at attempt to modify a write protected encrypted storage block.

The hypervisor may enable the guest program to perform the data copy by associating the destination storage block with the virtual machine executing the guest program. The destination storage block may be a storage block that is allocated by the hypervisor before, during, or after the hypervisor detects an attempt to modify the source storage block. In one example, the destination storage block may be a storage block that was not previously associated with the virtual machine and the hypervisor may associate the storage block with the virtual machine so the virtual machine can perform the copy.

The systems and methods described herein include technology that enables copying data in a security enhanced computing environment. In particular, aspects of the present disclosure may enable a hypervisor to perform copy on write for storage blocks that are encrypted with a location based encryption without corrupting the data or exposing the data in an unencrypted form to the hypervisor. In one example, the copy operations may be used for duplicating encrypted storage blocks that were previously consolidated using data deduplication techniques. In another example, the copy operations may be used for generating snapshots of encrypted storage blocks. In another example, the copy operations may enable a hypervisor to copy the encrypted data between different levels of a cache hierarchy. For example, an encrypted storage block of a virtual machine may be moved from primary storage (e.g., main memory) to secondary storage (e.g., extended memory, hard drive, solid state storage).

Various aspects of the above referenced methods and systems are described in details herein below by way of examples, rather than by way of limitation. The examples provided below discuss a virtualized computer system where the copy on write features may be used to reduplicate data that was previously consolidated using data duplication. In other examples, the copy on write may be used for producing snapshots, moving data within a data storage device or between data storage devices, other use or a combination thereof. The examples discussed below may be performed by aspects of a virtual machine, hypervisor, a host operating system, or a combination thereof. In other examples, the copy on write may be performed in a non-hardware virtualized computer system that is absent a hypervisor. The non-hardware virtualized computer system may include a kernel of an operating system that performs copy on write features on encrypted storage of one or more user space programs. In another example, the computer system may include operating system level virtualization and the kernel may perform copy on write features on encrypted storage of one or more containers using techniques discussed herein.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted. Computer system 100 may be a single host machine or multiple host machines that may be arranged in a homogenous or non-homogenous group (e.g., cluster system, grid system, or distributed system). Computer system 100 may include a rackmount server, a workstation, a desktop computer, a notebook computer, a tablet computer, a mobile phone, a palm-sized computing device, a personal digital assistant (PDA), etc. Computer system 100 may be a computing device implemented with x86 hardware, PowerPC®, SPARC®, or other hardware. In the example shown in FIG. 1, computer system 100 may include hypervisor 110, virtual machines 120A-Z, hardware devices 130, and network 140.

Hypervisor 110 may also be known as a virtual machine monitor (VMM) and may provide virtual machines 120A-Z with access to one or more features of hardware devices 130. Hypervisor 110 may run directly on the hardware of computer system 100 (e.g., bare metal hypervisor) or may run on or within a host operating system (not shown). Hypervisor 110 may manage virtual machines 120A-Z and provide them with access to system resources. Each of the virtual machines 120A-Z may be based on hardware emulation and may support para-virtualization, operating system-level virtualization, or a combination thereof. Virtual machines 120A-B may have the same or different types of guest operating systems 122A-B and virtual machine 120Z may be absent a guest operating system.

Guest operating systems 122A-B may be any program or combination of programs that are capable of managing computing resources of a virtual machine. In one example, guest operating systems 122A-B may include Linux®, Solaris®, Microsoft Windows®, Apple Macintosh, other operating system, or a combination thereof. Guest operating systems 122A-B may manage the execution of multiple processes that provide one or more computing services.

Guest program 123 may be a part of a full guest operating systems (e.g., 122A-B) or may be executable code that is separate from a full guest operating system as shown in FIG. 1. Guest program 123 may be any code that is capable of being executed by a virtual machine and may or may not include a guest kernel, guest applications, other program, or a combination thereof. Guest program 123 may comprise one or more kernel space programs (e.g., memory driver, network driver, file system driver) for interacting with emulated hardware or physical hardware. In one example, guest program 123 may be similar to a micro kernel or other kernel that provides a near-minimum amount of software that can provide mechanisms to manage storage resources (e.g., lean virtual machine). The mechanisms may include low-level address space management, thread management, inter-process communication (IPC), other services, or a combination thereof. Guest program 123 may be capable of managing, interacting, or interfacing with virtual devices (e.g., emulated devices), physical devices (e.g., actual tangible devices), other devices, or a combination thereof.

Hypervisor 110 may configure virtual machine 120Z so that guest program 123 can access guest storage assigned to one or more virtual machines 120A-Z. As discussed above, the content of the storage blocks may be encrypted with a location dependent cryptographic key and guest program 123 may have access to the data but the data may remain inaccessible to the hypervisor 110 that is managing the storage blocks. If the hypervisor were to copy or move the encrypted content to a new location any subsequent attempt to decode the content using the location dependent cryptographic key at the new location would be unsuccessful (e.g., mismatched keys). In one example, guest program 123 may have access to guest storage of virtual machine 120Z and also access to guest storage of virtual machines 120A and 120B (e.g., guest storage 124A-B).

Guest storage 124A-B may be any virtual data storage, logical data storage, physical data storage, other storage, or a combination thereof for storing, organizing, or accessing data. Guest storage 124A-B may each correspond to a portion of storage device 136 that has been designated for use by the respective virtual machine. Guest storage 124A-B may function as volatile data storage or non-volatile data storage as discussed below in regards to storage device 136. Guest storage 124A-B may be organized into one or more storage blocks that are accessible to the virtual machines as storage blocks 126A-Z.

Storage blocks 126A-Z may be used for storing, organizing, or accessing data and may include a contiguous or non-contiguous sequence of bytes or bits. Each of the storage blocks 126A-Z may be referred to as a guest storage block and may correspond to a logical data storage unit, physical data storage unit, or a combination thereof. In one example, the logical storage unit (e.g., guest page) may include data in an unencrypted form and may correspond to a physical storage unit (e.g., host page or frame) that includes the data in an encrypted form. In one example, storage blocks 126A-Z may be memory blocks and each memory block may correspond to an individual memory page, multiple memory pages, or a portion of a memory page. The memory pages may be guest physical memory or guest physical memory pages and may correspond one-to-one or many-to-one with a hypervisor memory page (e.g., host memory page). In another example, each of the storage blocks 126A-Z may correspond to a portion (e.g., sector, logical unit, region, volume, partition, etc.) of a mass storage device (e.g., hard disk device, solid state device) or other storage device.

Guest program 123 may be configured to copy data of storage blocks 126A-Z to one or more other storage blocks as shown by data copy operation 128. In the example shown in FIG. 1, guest program 123 may include an indication receiving component 125 and a data copying component 127, which are discussed in more detail in regards to FIGS. 2 and 3 below. Guest program 123 may communicate with hypervisor 110 using one or more indications 129.

Indication 129 may include one or more signals for identifying storage blocks. In one example, hypervisor 110 may use indication 129 to signal to guest program 123 the storage blocks that should be copied from (e.g, sources), copied to (e.g., destinations), compared (e.g., candidate storage blocks), other blocks, or a combination thereof. In another example, guest program 123 may use indication 129 to signal to hypervisor 110 that one or more storage blocks have been copied or are duplicates. In either example, the signal may be a message, interrupt, notification, exception, trap, instruction, other signal, or a combination thereof. The signal may be initiated by a virtual machine and transmitted to the hypervisor or may be initiated by the hypervisor and transmitted to the virtual machine. In one example, indication 129 may correspond to a system call, hypercall, function call, other call, or a combination thereof. Indication 129 may be transmitted before, during, or after a storage block is copied or a duplicate storage block is identified (e.g., selected or detected).

Indication 129 may be implemented as one or more different types of indications. In one example, indication 129 may be a first type of indication and may be a message that is transmitted from a virtual machine to the hypervisor or hypervisor to virtual machine and identifies an individual storage block or storage block range. The message may include identification data (e.g., identifiers) for the storage block or storage block ranges. Indication 129 may be included in a series of separate indications that each indicate an individual storage block or an individual range of storage blocks. In another example, indication 129 may be a second type that batches multiple different storage blocks together in one message. The message may be referred to as a batched message and may include identification data for multiple storage blocks associated with one or more copy operations. A batched messages may be advantageous because it may reduce the communications overhead (e.g., I/O or context switches) that occur between virtual machine 120Z and hypervisor 110.

In yet another example, indication 129 may be a third type that includes one or more signals that correspond to an updated shared data structure representing the status of storage blocks. The shared data structure may be shared between hypervisor 110 and one or more virtual machines 120A-Z and may indicate which storage blocks are source blocks, destination blocks, duplicates, non-duplicates, candidates, non-candidates, or a combination thereof. Indication 129 may include a first signal that may be sent prior to identifying storage blocks associated with a data copy operation and one or more second signals that may be sent after one or more storage blocks are identified (e.g., source and destination selected). The first signal may be in the form of a message that is transmitted during an initialization of guest program 123 (e.g., guest operating system) or initialization of a particular storage management module of guest program 123. The first signal may be initiated by guest program 123 or hypervisor 110 and may include information (e.g., reference, pointer) for identifying the shared data structure.

The shared data structure may represent guest storage 124A or represent multiple guest storages 124A-B. The shared data structure may be particularly useful for data deduplication and identifying which storage blocks are duplicates. For example, when guest program 123 detects storage blocks that are duplicates, the virtual machine 120Z may update the shared data structure to indicate to hypervisor 110 that the storage blocks of the other virtual machines include duplicates. Hypervisor 110 may subsequently access the shared data structure after the duplicate storage blocks are detected. In one example, hypervisor 110 may listen for second signals (e.g., modification events) that indicate the shared data structure has been updated. In another example, hypervisor 110 may or may not listen for second signals and may access the shared data structure responsive to determining storage blocks are needed (e.g., available storage blocks fall below a threshold or storage faults exceed a threshold).

The shared data structure may be modified by one or more of the virtual machines and may be accessible to the hypervisor. The shared data structure may be an array (e.g., bitmap), a linked list, a table, a matrix, other data structure, or a combination thereof. The shared data structure may include an element (e.g., bit flag, entry, or node) for each of the storage blocks and the element may indicate whether the storage block is duplicated, unduplicated, or other state. The shared data structure may be stored in shared storage that may be a portion of guest storage, hypervisor storage, other storage, or a combination thereof. In one example, the shared data structure may be stored in guest storage of virtual machine 120Z. In another example, the shared data structure may be stored in data storage of the hypervisor (e.g., hypervisor storage) and may be temporarily accessible (e.g., mapped) to one or more of the virtual machines. In either example, one or more of the virtual machines and the hypervisor may have access to the shared storage and the shared storage may or may not be encrypted. There may be a single shared data structure that corresponds to one or more groups of virtual machines (e.g., one or more different tenants) or multiple shared data structures that each correspond to a single group of virtual machines (e.g., shared data structure per tenant).

Hardware devices 130 may provide hardware functionality for performing computing tasks related to the copy on write features. Hardware devices 130 may include one or more storage devices 136 and one or more processing devices 132A, 132B, or combination thereof. One or more of these hardware devices may be split up into multiple separate devices or consolidated into one or more hardware devices. Some of the hardware devices shown may be absent from hardware devices 130 and may instead be partially or completely emulated by executable code.

Storage device 136 may include volatile or non-volatile data storage devices. Volatile data storage devices (e.g., non-persistent storage) may store data for any duration of time but may lose the data after a loss of power. Non-volatile data storage devices (e.g., persistent storage) may store data for any duration of time and may retain the data beyond a loss of power. In one example, storage device 136 may include one or more registers (e.g., processor registers) or memory devices (e.g., main memory, auxiliary memory, adapter memory). In another example, storage device 136 may include one or more mass storage devices, such as hard drives (hard disk drive (HDD)), solid-state storage (e.g., Solid State Drives (SSD), flash drive), other data storage devices, or a combination thereof. In a further example, storage device 136 may include a combination of one or more registers, one or more memory devices, one or more mass storage devices, other data storage devices, or a combination thereof that may or may not be arranged in a cache hierarchy.

Processing devices 132A and 132B may include one or more processors that are capable of accessing storage device 136 and executing instructions of guest program 123. Processing devices 132A and 132B may be a single core processor that is capable of executing one instruction at a time (e.g., single pipeline of instructions) or may be a multi-core processor that simultaneously executes multiple instructions. The instructions may encode arithmetic, logical, or I/O operations and may be used to execute a cryptographic function that performs encryption or decryption of data within storage device 136. Processing devices 132A-B and storage device 136 may interact with one another to store data in an encrypted form and provide access to the stored data in either an encrypted form or unencrypted form based on the context of the process attempting to access the data (e.g., VM process or hypervisor process).

One or more of the hardware devices 130 may execute a cryptographic function to encrypt or decrypt the data before, during, or after it is stored in storage device 136. The cryptographic function may be any function that is suitable for use in a standardized or proprietary cryptographic protocol and may involve one or more mathematical manipulations of content data. The cryptographic function may map data of an arbitrary size to a bit sequence of a fixed size or variable size. In one example, the cryptographic function may be a cryptographic function that takes a content message as input and outputs a value, which may be referred to as cipher text, a digest, hash, or a message digest. The cryptographic function may include a private key cryptographic function a public key cryptographic function, other cryptographic function, or a combination thereof. In one example, one or more of the hardware devices 130 may execute the cryptographic function without providing higher-level executable code (e.g., guest program 123, guest operating system 122A-B, hypervisor 110, or host operating system) access to the cryptographic function, cryptographic input, or a combination thereof. This is advantageous because it may reduce access to the cryptographic keys and unencrypted data, which may enhance security.

In one example, the cryptographic function may be an "in-place" cryptographic function that may avoid copying data of a storage block to another location during the execution of the cryptographic function (e.g., during data encryption or decryption). The in-place cryptographic function may transform data within a storage block of the storage device without using auxiliary data storage in the storage device. This may involve the content of the storage block being overwritten by the output of the cryptographic function while the cryptographic function executes. In one example, the in-place cryptographic function may use only the storage space of a single storage block and may update data within the storage block by swapping or replacing portions of data. In another example, the in-place cryptographic function may use a small amount of auxiliary data within the storage block or elsewhere for indices or pointers (e.g., counter pointers). The small amount of auxiliary storage space may be proportionate to the size of the unencrypted content and in one example may be O (log n), O (n), or other portion of "n", wherein "n" is the number of bits or bytes of the unencrypted content data. In any of the above example, the cryptographic function may encrypt or decrypt data using cryptographic input (e.g., one or more cryptographic keys).

The cryptographic input may be any cryptographic bit sequence and may include encryption keys, decryption keys, public keys, private keys, symmetric keys, asymmetric keys, other cryptographic data, or a combination thereof. The cryptographic input may include or be generated or derived from one or more initialization vectors, starting variables, other data, or a combination thereof. The cryptographic input may include or be based on the spatial data, temporal data, or contextual data as discussed in more detail below. In one example, the cryptographic input may include a location dependent cryptographic input that includes a bit sequence based on spatial data that is specific to one or more storage blocks, storage devices, processing devices, other hardware devices, or combination thereof. For example, cryptographic input may be based on data that is permanently or temporarily associated with the hardware device, such as hardware identification information or a physical memory address of a particular physical storage block (e.g., host memory frame or disk sector). The latter example may cause each storage block to be associated with different cryptographic input and therefore cause the cipher text of identical content to be different after it is encrypted.

The cryptographic input used to encrypt or decrypt data is accessible to the hardware device performing the cryptographic function and may or may not be accessible to one or more of the programs (e.g., guest program 123, guest operating systems 122A-B, hypervisor 110, or host operating system). In one example, the cryptographic input may be a cryptographic key that functions as an encryption key, a decryption key, or a combination thereof and the key may be accessible to a hardware device without being accessible to any of the programs. The programs may or may not provide cryptographic input to the hardware to derive the cryptographic key and the program may be unable to derive the cryptographic key in the absence of the hardware device or using a different hardware device. In another example, one or more of the cryptographic keys may be accessible to a program executed by the virtual machine (e.g., guest program 123 or guest operating systems 122A-B) without being accessible to the hypervisor 110. In yet another example, the hypervisor may have access to a cryptographic key to encrypt the data without having access to a cryptographic key to decrypt the data (e.g., access to encryption key but not decryption key.

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
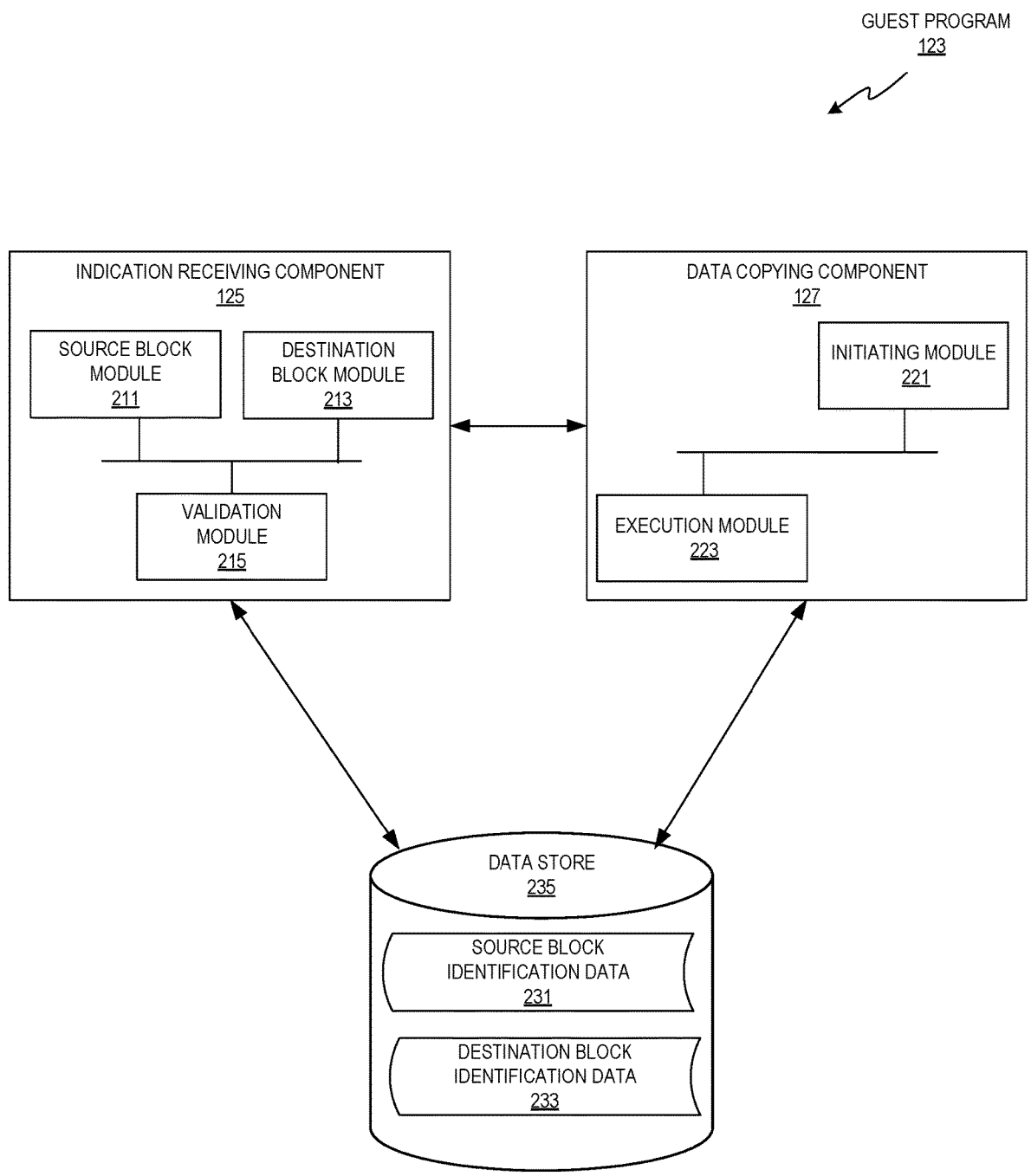
FIG. 2 depicts a block diagram illustrating components and modules of an example guest program (e.g., a guest operating system, driver, or executable code) that is executed by a virtual machine, in accordance with one or more aspects of the present disclosure.
Figure 3:
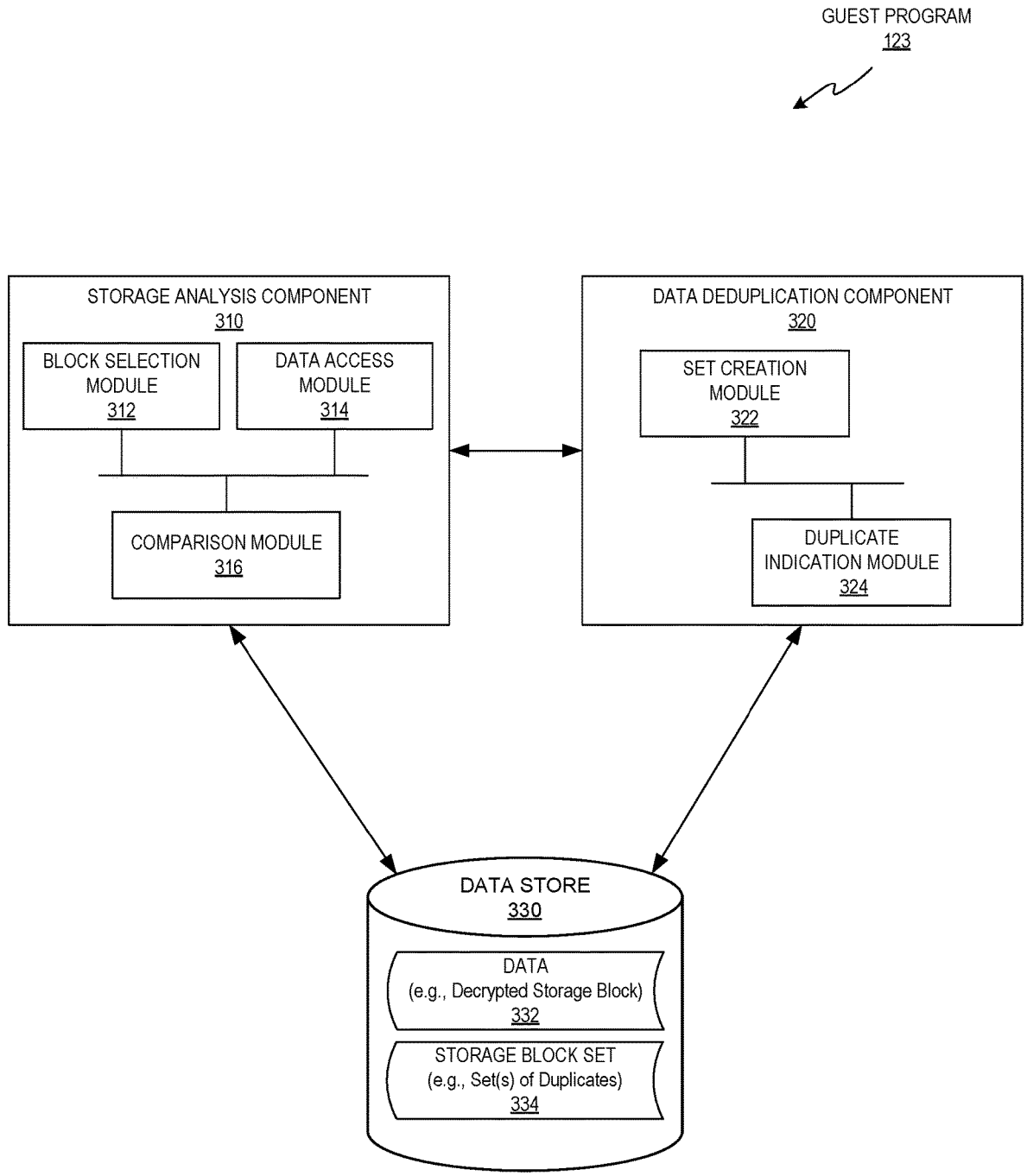
FIG. 3 depicts a flow diagram of an example method that enables a guest program and hypervisor to perform data deduplication for encrypted data storage of one or more virtual machines, in accordance with one or more aspects of the present disclosure.
Figure 4:
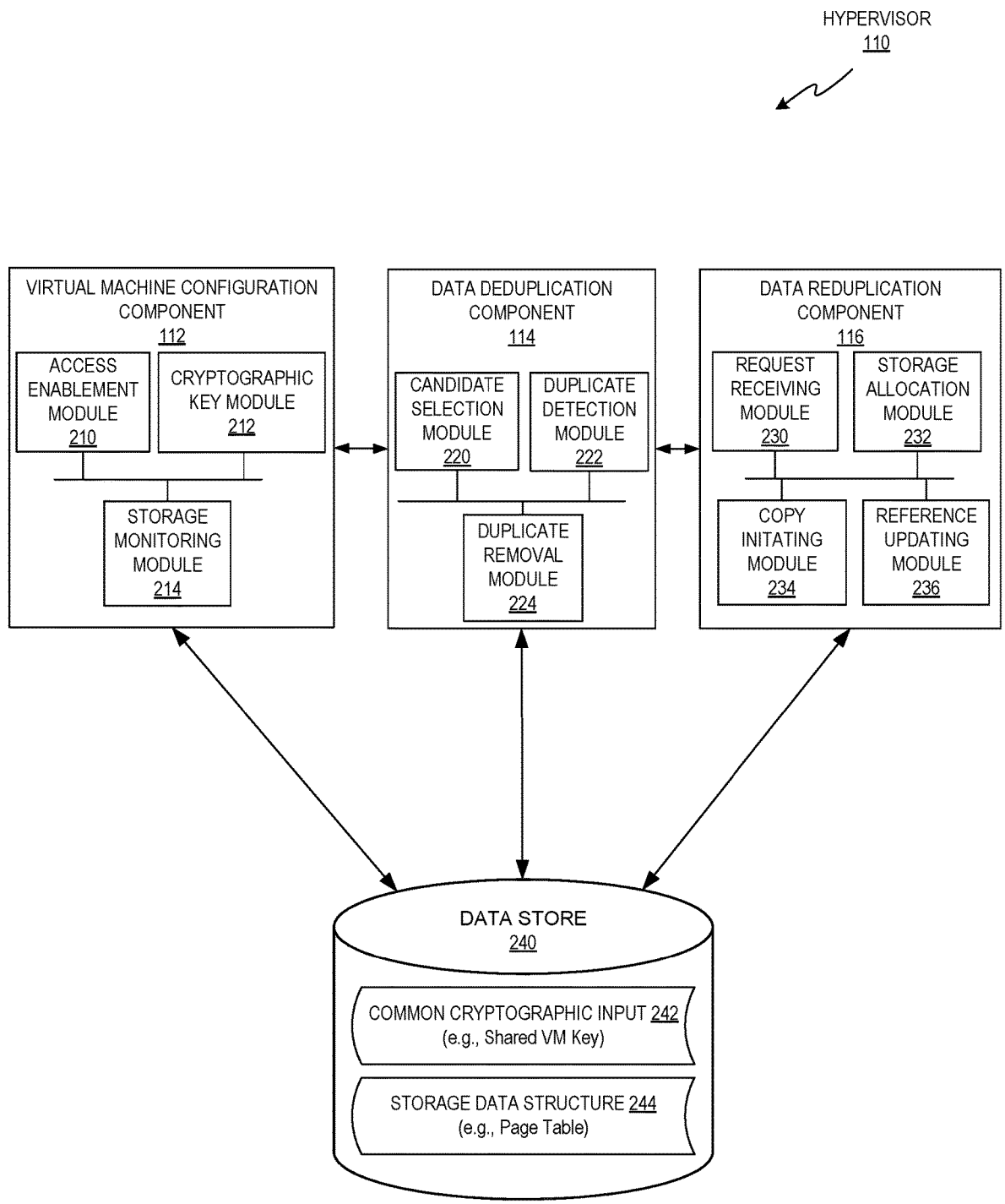
FIG. 4 depicts a block diagram illustrating components and modules of an example hypervisor (e.g., a virtual machine monitor) that may use copy-on-write features for data reduplication, in accordance with one or more aspects of the present disclosure.

FIGS. 2-4 are block diagrams illustrating example components and modules of hypervisor 110 and guest program 123, in accordance with one or more aspects of the present disclosure. FIG. 2 may include the features of guest program 123 used to implement copy on write features in a variety of different use cases (e.g., deduplication, snapshot, paging). FIG. 3 may include a specific use case where the guest program is used to perform data deduplication. FIG. 4 provides example components of a hypervisor that interacts with guest program 123 to perform data deduplication and reduplication using the copy on write features of guest program 123. As discussed above, guest program 123 may be executable code and may or may not be part of a full operating system, a lightweight operating system, or a standalone kernel (e.g., micro-kernel, just enough Operation System (JeOS)). Guest program 123 may be executed by a virtual machine in a mode or space associated with the virtual machine (e.g., one or more virtual machine processes). The virtual machine may be configured to enable guest program 123 to access storage resources of another virtual machine.

Referring to FIG. 2, guest program 123 may include an indication receiving component 125 and a data copying component 127. Indication receiving component 125 may enable guest program 123 to receive and analyze one or more indications (e.g., 129 of FIG. 1) to determine the storage blocks affected by the copy on write features. The indication may be received from a memory management feature of an underlying kernel, which may function as the hypervisor, host operating system, container docker, other function, or a combination thereof. In one example, indication receiving component 125 may include a source block module 211, a destination block module 213, and a validation module 215.

Source block module 211 may enable guest program 123 to determine a source storage block in view of an indication from a hypervisor. The indication may provide identification data that can be used by guest program 123 to identify one or more storage blocks (e.g., source block identification data 231) that include data to be copied. The storage block may be accessible to the guest program 123 and may be assigned to the virtual machine executing guest program 123 or may be assigned to a different virtual machine. In one example, the source storage block may be encrypted in a manner that enables the guest program to access the decrypted content but prohibits the hypervisor for accessing the decrypted content. In another example, the source storage block may be unencrypted (e.g., free, without, absent, missing, or not encrypted) and the data copy operation may copy data from the unencrypted source storage block into an encrypted destination storage block determined by destination block module 213.

Destination block module 213 may enable guest program 123 to determine a destination storage block that can be used to store a copy of the data from the source storage block. The destination storage block may be selected by the hypervisor, by the guest program 123, or a combination thereof and corresponding destination block identification data 233 may be stored in data store 235. In one example, the hypervisor may select the destination storage block and include identification data of the destination storage block in an indication provided to guest program 123. In another example, guest program 123 may select the destination storage block by analyzing available storage blocks (e.g., storage blocks previously freed). In yet another example, the hypervisor may provide a set of available storage blocks (e.g., a pool of blocks) to guest program 123 using an indication and guest program 123 may select the destination storage block from the set of available storage blocks. In any of the examples, the destination storage block may or may not be encrypted as discussed above in regards to the source block module 211.

Validation module 215 may validate the use of or access to the source storage block, destination storage block, or a combination thereof. The validation of a storage block may occur before, during, or after initiating a data copy operation involving the storage block. Validating the use of a storage block may involve determining which virtual machine the storage block is associated with and whether the storage block is in use by one or more virtual machines. For example, validation module 215 may analyze the destination storage block to determine it is not in use by any virtual machines before copying in data from the source destination storage block. Determining whether a storage block is in use may involve checking one or more storage data structures to see if the content is in use (e.g., available, dirty, free, assigned, designated, allocated). This may involve checking to see if it is in use by a virtual machine, hypervisor, host operating system, hardware adapter, other device, or a combination thereof. Validation module 215 may also or alternatively validate access to the storage blocks before, during, or after data copying component 127 begins the data copy operation.

Data copying component 127 may enable guest program 123 to copy the data of the source storage block to the destination storage block. One or more of the storage blocks may be encrypted with location independent cryptographic input and the hypervisor may not have the ability to decrypt or encrypt data of the destination storage block, source storage block, or a combination thereof. If the hypervisor were to copy over data from an encrypted storage block or into an encrypted storage block, the data may become inaccessible because the key corresponding to the new storage block may be unable to successfully transform the data (e.g., key mismatch). To work around this limitation, guest program 123 may perform the data copy operation on behalf of the hypervisor. In the example shown in FIG. 2, data copying component 127 may include an initiating module 221 and an execution module 223.

Initiating module 221 may enable guest program 123 to initiate the data copy operation to copy data from the source to the destination storage block. In one example, initiating module 221 may initiate the data copy operation in response to receiving an indication from the hypervisor. The indication from the hypervisor may be an indication to start the copy and may or may not be the same indication that includes identification data for the source storage block, the destination storage block, or a combination thereof. In another example, initiating module 221 may initiate the data copy operation based on detecting an attempted change or validating one or more of the storage blocks. In yet another example, the hypervisor may cause the virtual machine to initiate the data copy operation by injecting one or more instructions, interrupts, or exceptions into the virtual machine, guest program, or a combination hereof.

The hypervisor may inject an interrupt or exception that causes a process executed by the virtual machine to initiate the data copy operation. In one example, the hypervisor may inject an interrupt (e.g., non-maskable interrupt (NMI)) that may be a notification or alert that appears to be issued by a virtual processor of the virtual machine and may indicate an event needs attention. The interrupt may be received by an interrupt handler of the virtual machine and the interrupt handler may cause the virtual machine to perform the action. In another example, the hypervisor may inject an exception into the virtual processor or initiate an exception that is received by an exception handler of the virtual machine and may cause the virtual machine to perform the action. In either example, the executable code necessary to perform the data copying operation may exist within the virtual machine or may be embedded within a portion of the virtual machine before, during, or after the message is generated. The message may be a hardware generated messages (e.g., hardware signals) in the form of interrupts, traps, notifications, exceptions, faults, other signals, or a combination thereof.

Execution module 223 may access data of initiating module 221 and perform the data copy operation to copy data from a source storage block to one or more destination storage blocks. Copying data between storage locations may involve copying digital content of the entire storage block or a portion of the storage block. The copying may be performed by the guest program without exposing the copied data in a decrypted form to the. The data copying operation may involve one or more copy operations, move operations, migrate operations, other operations, or a combination thereof.

The data copy operation may involve modifying the content or points associated with a storage block. In one example, the copy may involve physically manipulating the bits at the new storage block. In another example, the copying may involve an operation that manipulates one or more pointers without physically manipulating the bits of the storage block at the source or destination. For example, that may involve re-referencing a storage block that was previously dereferenced. In yet another example, the copying may involve a combination of manipulating physical bits and references to the physical bits. In any of the examples, the data may be copied while the content is in an unencrypted form but it may be performed at the hardware level so that the content remains hidden (e.g., concealed, unexposed, secret, inaccessible, unavailable) from the hypervisor and/or host operating system. During the copy, the content may be exposed to the virtual machine in an encrypted or unencrypted form or it may be hidden from virtual machine when it is performed at a hardware level.

The source storage block and the destination storage block may be on the same or different data storage devices. In one example, each of the storage blocks may comprise encrypted memory pages stored in the same memory device and the source location and the destination location may each comprise a physical memory address of the same memory device. In another example, the storage blocks may comprise encrypted memory pages stored across multiple memory devices and the source storage block may be in a first memory device and the destination storage block may be in a second memory device. The first and second memory devices may be memory devices that were or were not manufactured separately and may be associated with the same or different caching levels (e.g., main memory) of a cache hierarchy.

FIG. 3 is a block diagram illustrating example components and modules of guest program 123 that enables the hypervisor to perform data deduplication, in accordance with one or more aspects of the present disclosure. In the example shown, guest program 123 may include a storage analysis component 310 and a data deduplication component 320.

Storage analysis component 310 may enable guest program 123 to analyze data storage to identify portions of the data storage that contain duplicate data. The data storage may be accessible to a virtual machine executing the guest program and may be assigned and in use by other virtual machines. Storage analysis component 310 may include a block selection module 312, data access module 314, and a comparison module 316.

Block selection module 312 may analyze data associated with one or more storage blocks to identify storage blocks that have an increased probability of containing duplicate data. The data associated with the storage blocks may be any data that relates to a particular storage block or group of storage blocks and may include temporal data, spatial data, contextual data, other data, or a combination thereof. The temporal data associated with a storage block may be any data related to a time or frequency of access, modification, creation, deletion, or other operation that affects the one or more storage block. The spatial data may be any data that relates to the location of one or more storage blocks with respect to the storage device. The locations may be a particular location (e.g., address) or a relative location (e.g., adjacent to) and may include logical locations (e.g., virtual address, guest physical address) or physical locations (e.g., host physical address) of the storage block. The contextual data may be any data that provides a context of a storage block or content within the storage block and may indicate a particular thread, process, user, host, virtual machine, or a combination thereof is associated with a specific storage block. The data associated with the storage blocks may be determined by guest program 123 by accessing, scanning, searching, or monitoring the storage blocks or may be received from a hypervisor or host operating system (e.g., hypervisor hints).

Block selection module 312 may calculate a similarity score by analyzing and/or weighting the temporal data, spatial data, or contextual data associated with the storage blocks. The similarity score may be a probabilistic value that indicates the probability that separate storage blocks or groups of storage blocks include the same or similar content data. The probabilistic value may be represented in any form such as decimals, fractions, percentages, integers, ratios, other forms, or combination thereof. Block selection module 312 may select one or more storage blocks in view of the similarity score. For example, block selection module 312 may select one or more storage blocks that exceed (e.g., above or below) a predetermined threshold. Block selection module 312 may identify particular storage blocks or groups of storage blocks and may add them to a set of candidate storage blocks.

Data access module 314 may enable guest program 123 to access data of the selected storage blocks. The data of a selected storage block may include data stored internal to the storage block and/or data that is stored external to the storage block. The data stored external to the storage block may be associated with the storage block and used for managing or organizing storage blocks (e.g., metadata, time data, dirty data, fingerprint data). Data access module 314 may access the data of the storage blocks so that the storage blocks can be compared to identify duplicate data. As discussed above, the storage blocks may be encrypted using different cryptographic input and this may cause storage blocks that have identical unencrypted versions of data to have different encrypted versions of the data. Data access module 314 may enable guest program 123 to request access to the storage blocks in the context of the virtual machine (as opposed to hypervisor) to ensure that the data being accessed is decrypted before being accessed by comparison module 316.

Comparison module 316 may enable guest program 123 to perform one or more comparisons of unencrypted data from different storage blocks (e.g., data 332) to identify duplicate storage blocks. Duplicate storage blocks may be different storage blocks that store equivalent data. The equivalent data may be the same identical data (e.g., bit-for-bit match) or may be substantially similar data (e.g., subset of data is bit-for-bit match). Substantially similar data is data that includes one or more portions that are identical and one or more portions that are not identical. The one or more portions that are not identical may be referred to as different data and may be at the beginning, end, or other position within the storage block. The different data may be padding data (e.g., data to fill remaining portion of storage block), prior use data (e.g., data left over from earlier write), descriptive data (e.g., little-endian, big-endian), other data, or a combination thereof. The duplicate storage blocks may correspond to storage blocks in the same guest storage, different guest storage, or a combination thereof.

When comparing the content data of storage blocks, not all of the data may need to be compared because some of the data within a storage block may be extraneous data (e.g., padding or unoccupied). Therefore, storage blocks with similar but non-identical content may still be determined to have equivalent data and be identified as duplicate storage blocks because they contain at least some identical content. In one example, comparison module 316 may directly compare the data of a storage block with the data of one or more other storage blocks. In another example, comparison module 316 may indirectly compare different storage blocks by comparing data representative of the data in the storage blocks. The representative data may be a hash of the decrypted content or a hash of one or more portions of the decrypted data of the storage blocks (e.g., just beginning or end portions).

Data deduplication component 320 may enable guest program 123 to interact with a hypervisor or host operating system to remove some or all of the duplicate content. In the example shown in FIB. 3, data deduplication component 320 may include a set creation module 322 and a duplicate indication module 324. Set creation module 322 may enable guest program 123 to add duplicate storage blocks to a storage block set 334. Storage block set 334 may be a data structure that includes one or more lists, tables, matrices, arrays, pointers, ranges, values, flags, other data structures, or a combination thereof. Storage block set 334 may be generated by guest program 123 and stored in data store 330 or may be generated by another program (e.g., hypervisor) and shared with guest program 123 as discussed above (e.g., shared data structure). Set creation module 322 may access and update storage block set 334 to add one or more storage blocks that have duplicate content. Adding the storage blocks may involve adding identification data for the storage block to the storage block set 334. The identification data may include identification data of the storage blocks (e.g., storage identifier, storage address, offset), the virtual machines (e.g., VM ID, process ID, owner), the storage devices, the duplicated data (e.g., bit pattern), other data, or a combination thereof. In one example, storage block set 334 may correspond to a particular instance of duplicate storage blocks and all blocks in the set may be a duplicate of one another. In another example, storage block set 334 may correspond to multiple different instances of duplicates storage blocks and each instance of duplicates may be referred to as a duplicate subset. In either example, the one or more storage block sets 334 may be provided to a hypervisor using duplicate indication module 324.

Duplicate indication module 324 may enable guest program 123 to provide an indication to the hypervisor that indicates the multiple virtual machines include duplicate storage blocks. As discussed above, the indication may be any message or signal that indicates the existence of duplicate storage blocks and may or may not identify one or more of the storage blocks that are duplicates. Duplicate indication module 324 may provide the indication by transmitting the identification data of storage block set 334 to the hypervisor or by providing an indication that references a shared storage block set 334 that has been updated. The shared storage block set 334 may be stored in shared storage that is accessible by both the virtual machine executing the guest program 123 and by the hypervisor. In one example, duplicate indication module 324 may provide an indication to the hypervisor by initiating a hypercall. In another example, duplicate indication module 324 may provide the indication by updating a particular storage location (e.g., shared data structure).

In one example, duplicate indication module 324 may transmit the indication in response to a quantity of storage blocks, a quantity of sets, or a combination thereof satisfying one or more threshold values (e.g., at, above, or below threshold value). The threshold value may be a quantity, ratio, percentage, or other value and may be based on a size of the storage (e.g., total storage, allocated storage, unallocated storage, available storage) and may be a particular amount of blocks (e.g., storage block count) or a particular amount of space occupied by the storage blocks (e.g., buffer space limit). The threshold values may include one or more integers, percentages, ratios, other values, or a combination thereof. The values may be relative to the size or limit of a storage device, storage blocks, processing devices, computer system, hypervisor, virtual machines, guest program, heap, page, buffer, other data structure, or a combination thereof.

Providing the indication of the duplicate storage blocks is discussed in detail in regards to FIG. 1 (e.g., indication 129) and may cause the hypervisor to deduplicate the storage blocks. The hypervisor may deduplicate the storage blocks by updating one or more storage structures to remove one or more of the duplicate storage blocks. The storage structure may include one or more references that correspond to the one or more duplicate storage blocks. Each reference may identify (e.g., point to) the beginning, middle, end, or other portion of the one or more storage blocks. When a first storage block and a second storage block are determined to be duplicates, the hypervisor or guest program may update the storage structure to change a reference for the first storage block to subsequently reference the same location as the second storage block. As a result, the references for the first storage block and the second storage block may point to a common storage location. This may free the first block by de-referencing the first storage block so that it can be subsequently reused, reallocated, removed, flushed, wiped, or other action.

The storage structure modified by the hypervisor in view of the guest program indication may be a memory cache data structure or it may be another storage structure that corresponds to a caching system, a file system, a database system, other storage system, or a combination thereof. In one example, the storage structure may be an address-translation cache (e.g., Translation Lookaside Buffer (TLB)) that translates between virtual and physical memory locations (e.g., memory addresses). The memory cache data structure may include one or more pointer entries (e.g., Page Table Entries (PTE)) that point to respective storage blocks (e.g., memory pages). After detecting duplicates, duplicate indication module 324 may transmit an indication that causes hypervisor 110 to update the memory cache data structure by invalidating the pointer entries for one or more of the duplicate storage blocks and may flush the address-translation cache to remove references to or the content of the duplicates.

FIG. 4 is a block diagram illustrating example components and modules of hypervisor 110, in accordance with one or more aspects of the present disclosure. Hypervisor 110 may include a virtual machine configuration component 112, a data deduplication component 114, and a data reduplication component 116.

Virtual machine configuration component 112 may enable hypervisor 110 to configure a virtual machine to access data storage of one or more other virtual machines. The data storage may be encrypted data storage that is accessible to the virtual machines without being accessible to the hypervisor managing the virtual machines. In one example, virtual machine configuration component 112 may include an access enablement module 210, a cryptographic key module 212, and a storage monitoring module 214.

Access enablement module 210 may enable the hypervisor to provide the guest program with access to guest storage of multiple different virtual machines. Hypervisors often configure virtual machines to be isolated from one another so that a process executed by a first virtual machine does not have access to guest storage of a second virtual machine. Access enablement module 210 may enable hypervisor 110 to configure a first virtual machine to access guest storage of multiple virtual machines by executing one or more operations to map, mount, link, designate, assign, associate, connect, or other operation that enables access to the guest storage of other virtual machines. In one example, hypervisor may designate a portion of hypervisor storage as guest storage and may map the portion into multiple different virtual machines. Mapping the guest storage into the respective virtual machines may occur at different times and the guest storage may be associated with a first virtual machine when the first virtual machine is instantiated and may be associated with a second virtual machine before, during, or after the second virtual machine is instantiated. For example, the hypervisor may modify access of the second virtual machine to the guest storage of the first virtual machine in response to the activation or deactivation of the guest program or virtual machine as discussed below.

Cryptographic key module 212 may enable hypervisor 110 to configure a virtual machine so that the virtual machine is associated with a cryptographic key for accessing guest storage of one or more other virtual machines. The cryptographic key may be the same key used by the other virtual machines or may be a different key (e.g., mathematically related or derived key). The cryptographic key may be associated with the virtual machine in any manner that enables the hardware device to retrieve and use the key when the virtual machine attempts to read or write to the guest storage of another virtual machine. Associating the cryptographic key with the virtual machine may involve storing, copying, linking, updating, transforming, or other operation on a key associated with the other virtual machine, the hypervisor, or an entity using the virtual machine. The cryptographic key may be associated with the virtual machine with or without being accessible to the virtual machine. For example, the cryptographic key may be stored in a particular storage location that can be accessed by a hardware device executing the cryptographic function but may not be accessible to a process executed by the virtual machine. As discussed above, the cryptographic function may use the cryptographic key in combination with one or more other cryptographic input (e.g., location based input). The cryptographic key used by the virtual machine may be the same or similar to common cryptographic input 242.

Common cryptographic input 242 may be used to encrypt or decrypt data and may not be specific to individual storage blocks as was discussed in regards to the location dependent cryptographic input. For example, common cryptographic input 242 may be a cryptographic key for a particular virtual machine and used to encrypt or decrypt some or all of the storage blocks associated with the particular virtual machine. In one example, common cryptographic input 242 may be a shared cryptographic key that is shared by multiple virtual machines associated with an entity (e.g., all VMs of a tenant/consumer/client). In another example, common cryptographic input 242 may include multiple different shared keys (e.g., a key chain) and each of the keys may correspond to a particular one of the virtual machines. In either example, guest program 123 may have access to common cryptographic input 242 and use the common cryptographic input 242 to access storage blocks in guest storage.

Common cryptographic input 242 (e.g., shared key) may be used individually or in combination with the location dependent cryptographic input to create or derive the one or more encryption keys or decryption keys used by the hardware device. In one example, the common cryptographic input 242 is accessible to the virtual machine but the encryption key and/or decryption key that is used by the hardware device may be inaccessible to some or all higher-level programs (e.g., hypervisor, guest operating system, guest program). In other examples, common cryptographic input 242 may be based on the spatial, temporal, or contextual data.

Storage monitoring module 214 may enable hypervisor 110 to monitor the availability of data storage for the virtual machines, hypervisor, host operating system, other program, or a combination thereof. Storage monitoring module 214 may determine the availability of the data storage in view of one or more attributes of the data storage. The attributes of the data storage may be based on the quantity and/or availability of the data storage. The availability of the data storage may correspond to whether data storage is or is not allocated (e.g., designated, assigned), initialized (e.g., initiated, populated with default value), resident (e.g., paged out/in, swapped out/in), in use, or a combination thereof. The quantity of data storage may correspond to the total quantity of data storage or the quantity of data storage associated with a particular state (e.g., quantity available for use).

The attributes may correspond to the availability of data storage at one or more levels. The levels may include a physical data storage level (e.g., storage device availability), virtual machine data storage level (e.g., guest storage availability), hypervisor data storage level (hypervisor storage availability), other data storage level, or a combination hereof. Storage monitoring module 214 may monitor the availability of data storage at a particular level and compare the availability with one or more thresholds.

The one or more thresholds may be data values or ranges of values that when satisfied cause the hypervisor to activate or deactivate data duplication. Determining whether a threshold is satisfied may involve one or more comparisons to determine an attribute (e.g., available memory) is at (e.g, equal to), above (e.g., greater than, exceeds), or below (e.g., less than) the threshold. The data values may include one or more integers, ratios, percentages, or other value and may be based on a size of the storage (e.g., total storage, allocated storage, unallocated storage, available storage), amount of storage blocks (e.g., storage block count), or amount of space occupied by the storage blocks (e.g., buffer space limit). The values may be relative to the size or limit of storage devices, storage blocks, processing devices, hypervisor, virtual machines, guest program, heap, page, buffer, other data structure, or a combination thereof.

Multiple thresholds may be used to regulate the activation and deactivation of the data deduplication. For example, there may be a first threshold for determining when to activate the data duplication and a second threshold for determining when to deactivate the data deduplication. Storage monitoring module 214 may continuously or discretely monitor the quantity of data storage available to hypervisor 110 and compare it to the first or second thresholds. In one example, the quantity of data storage available to hypervisor 110 may be based on the total quantity of data storage accessible to the hypervisor minus the amount in use by the virtual machines and hypervisor. The quantity may then be compared to the first threshold (e.g., activation threshold) and if the quantity satisfies the threshold (e.g., memory use above 90%, memory availability below 10%) hypervisor 110 may activate the data deduplication. After activating the data deduplication, hypervisor 110 may compare the quantity to the second threshold (e.g., deactivation threshold) and if the quantity satisfies the threshold (memory use below 80%, memory availability above 20%) hypervisor 110 may deactivate the data deduplication.

Data deduplication component 114 may enable hypervisor 110 to perform data deduplication on encrypted data storage of one or more virtual machines to remove some or all of the duplicate content. Data deduplication component 114 may interact with guest program 123, which is discussed in more detail below in regards to FIG. 3. In one example, data deduplication component 114 may include a candidate selection module 220, a duplicate detection module 222, and a duplicate removal module 224.

Candidate selection module 220 enables hypervisor 110 to select a set of candidate storage blocks that may be compared by the guest program to identify duplicate storage blocks. Candidate selection module 220 may analyze data associated with one or more storage blocks to identify storage blocks that have an increased probability of containing duplicate data. The data associated with the storage blocks may be any data that relates to a particular storage block or group of storage blocks and may include temporal data, spatial data, contextual data, other data, or a combination thereof. The temporal data associated with a storage block may be any data related to a time or frequency of access, modification, creation, deletion, or other operation that affects the one or more storage block. The spatial data may be any data that relates to the location of one or more storage blocks with respect to the storage device. The locations may be a particular location (e.g., address) or a relative location (e.g., adjacent to) and may include logical locations (e.g., virtual address, guest physical address) or physical locations (e.g., host physical address) of the storage block. The contextual data may be any data that provides a context of a storage block or content within the storage block and may indicate a particular thread, process, user, host, virtual machine, or a combination thereof is associated with a specific storage block. The data associated with the storage blocks may be determined by hypervisor 110 by accessing, scanning, searching, or monitoring the storage blocks or may be received from a hypervisor or host operating system (e.g., hypervisor hints). In one example, candidate selection module 220 may select the storage blocks in view of a heuristic that uses modification times of storage blocks.

Candidate selection module 220 may calculate a similarity score by analyzing and/or weighting the temporal data, spatial data, or contextual data associated with the storage blocks. The similarity score may be a probabilistic value that indicates the probability that separate storage blocks or groups of storage blocks include the same or similar content data. The probabilistic value may be represented in any form such as decimals, fractions, percentages, integers, ratios, other forms, or combination thereof. Candidate selection module 220 may select one or more storage blocks in view of the similarity score. For example, candidate selection module 220 may select one or more storage blocks that exceed (e.g., above or below) a predetermined threshold. Candidate selection module 220 may identify particular storage blocks or groups of storage blocks and may add them to a set of candidate storage blocks.

Duplicate detection module 222 may enable hypervisor 110 to interact with the guest program to detect duplicate storage blocks. In one example, hypervisor 110 may provide the guest program with the set of candidate storage blocks to be compared. In another example, hypervisor 110 may not provide the guest program with the set storage blocks to be compared and the guest program will select which storage blocks to compare as discussed below in regards to FIG. 3. In either example, the comparison of storage blocks may be performed by the guest program and the hypervisor may receive an indication from the guest program that one or more storage blocks are duplicate storage blocks. As discussed above, hypervisor 110 may receive the indication in response to the guest program making a hypercall and the hypercall may indicate the one or more locations (e.g., guest physical addresses) of the duplicate storage blocks.

Duplicate removal module 224 may enable hypervisor 110 to update the duplicate storage blocks to reference a common storage location. In one example, updating the duplicate storage blocks may involve updating the second storage block to reference a physical storage location of the first storage block. Updating a reference may involve modifying a storage data structure 244 to remove one or more duplicate storage blocks. Storage data structure 244 may include one or more references that correspond to one or more storage blocks. Each reference may correspond to (e.g., point to) the beginning, middle, end, or other portion of the one or more physical storage blocks (e.g., memory frames). When a first storage block and a second storage block are determined to be duplicates, duplicate removal module 224 may update the storage data structure 244 to change a reference to the first storage block to subsequently reference the second storage block. As a result, the references for the first storage block and the second storage block may point to the identical content of the storage block (i.e., second storage block content). This may effectively remove the first block by de-referencing the first storage block so that it can be subsequently reused, reallocated, flushed, wiped, or other action.

Storage data structure 244 may be a memory cache data structure or it may be another storage data structure that corresponds to a caching system, a file system, a database system, other storage system, or a combination thereof. In one example, storage data structure 244 may be an address-translation cache (e.g., Translation Lookaside Buffer (TLB)) that translates between virtual and physical memory locations (e.g., memory addresses). The memory cache data structure may include one or more pointer entries (e.g., Page Table Entries (PTE)) that point to respective storage blocks (e.g., memory pages). After receiving an indication of the duplicates, duplicate removal module 224 may update the memory cache data structure by invalidating the pointer entries for one or more of the duplicate storage blocks and may flush the address-translation cache to remove references to or the content of the duplicates.

Data reduplication component 116 may enable data that was deduplicated to be reduplicated for subsequent modification. When data is deduplicated it may be consolidated into one or more storage blocks that are unmodifiable (e.g., read-only, write protected) and data reduplication component 116 may duplicate the data to enable the storage blocks to be modified independent of one another. In one example, data reduplication component 116 may include a request receiving module 230, a storage allocation module 232, a copy initiating module 234, and a reference updating module 236.

Request receiving module 230 may receive an indication that a virtual machine is requesting to modify a storage block that was consolidated during a de-duplication process. The request may correspond to storage block identification data, modification data, other data, or a combination thereof. The storage block identification data may be used to determine one or more storage blocks that correspond to references to a common storage location. The modification data may identify an operation or instruction that initiated the modification and the original or modified data. The request may be received by a processing device and may cause a hypervisor to be initiated (e.g., context switch from VM to hypervisor).

Storage allocation module 232 may allocate data storage that can be subsequently used to store a copy of the encrypted data. The encrypted data may be stored at a first storage location and storage allocation module 232 may allocate storage at a second storage location. The first and second storage locations may be logical locations or physical locations that are on the same storage device or on different storage devices. In one example, the first storage location may be associated with a first memory block (e.g., first memory page) and the second storage location may be associated with a second memory block (e.g., second memory page) and the first and second memory blocks may be on the same or different memory devices.

Storage allocation module 232 may enable hypervisor to allocate storage blocks within one or more particular virtual machines and provide guest program with access to the newly allocated storage blocks. A virtual machine may be associated with one or more storage blocks when the virtual machine is created (e.g., constructed), launched (e.g., initiated), during execution, or a combination thereof. During the virtual machine's operation, the hypervisor may associate one or more storage blocks with the virtual machine that were not previously associated with the virtual machine. In one example, the storage allocation module 232 may update the virtual machines configuration to increase the storage capacity of a virtual machine by adding one or more storage blocks. In another example, the storage allocation module 232 may update the virtual machines configuration to alter the storage capacity of the virtual machine without expanding the storage capacity. For example, it may disassociate one or more storage blocks at a first location that were previously associated with the virtual machine and then associate one or more new storage blocks at a second location that were not previously associated with the virtual machine. This may result in the storage capacity of the virtual machine remaining constant. Associating a storage block with the virtual machine may provide the virtual machine with access to a storage block that was not previously accessible to the virtual machine. The association of the storage block may involve mapping, linking, mounting, installing, other action, or a combination thereof.

The association of the storage block with the virtual machine may be initiated or performed by executable code that supports or hosts the virtual machine. The executable code may be included within the hypervisor, host operating system, hardware firmware, other executable code or a combination thereof and may involve updating or configuring the virtual machine (e.g., guest operating system, VM firmware), hypervisor, host operating system, storage device, or a combination thereof. In one example, the storage block may be a portion of a memory storage system (e.g., memory page) and associating the portion of memory may involve executing a memory mapping instruction (e.g., mmap system call). In another example, the storage block may a portion of another storage system such as a file system, data base system, other storage system, or a combination thereof.

Copy initiating module 234 may enable hypervisor 110 to cause the guest program to copy the data of the encrypted storage block to the newly allocated or previously allocated second storage location. The data may be encrypted with location independent cryptographic input and the hypervisor 110 may not have access to a decrypted version of the data. If the hypervisor were to copy over the encrypted data it may become inaccessible because the key corresponding to the new location may be unable to successfully decrypt the data. To overcome this, hypervisor 110 may instruct the guest program to perform the data copy. The data copy operation may copy data of a storage block between storage locations and may involve copying digital content of the entire storage block or just a portion of the storage block. The copying may be performed by the guest program without exposing the decrypted content to the hypervisor that initiated the data copying operation. Copying a storage block may involve copying digital content of one or more storage blocks to a new location and may involve a copy operation, a migrate operation, a move operation, other operation, or a combination thereof. In one example, the copy may involve physically manipulating the bits at the new location. In another example, the copying may involve an operation that manipulates one or more pointers without physically manipulating the bits of the storage block at the original or new locations. For example, that may involve re-referencing a storage block that was previously dereferenced. In yet another example, the copying or subsequent steps of the migration may involve a combination of manipulating physical bits and references to the physical bits. The references (e.g., pointers) may be stored in storage data structure 244.

Copy initiating module 234 may restrict access to the source or destination storage blocks before, during, or after the data copy operation in order to avoid data being corrupted or lost. As discussed above, the storage blocks may be assigned or associated with a virtual machine that accesses and modifies the storage blocks. The virtual machine may be associated with one or more computing processes and one or more virtual processing devices (e.g., virtual central processing unit (vCPU)). Prior to the executing the data copy operation, the hypervisor may restrict all the virtual machines (except the one executing the guest program) from accessing or modifying the storage blocks associated with the data copy operation.

Reference updating module 236 may be the same or similar to duplicate removal module 224 but may perform tasks to reduplicate a previously deduplicated storage block. Reference updating module 236 may update storage data structure 244 to update a reference that points to the original storage block to subsequently point to the new storage block. This may be advantageous because the original storage block may comprise read-only data (e.g., deduplicated data) and the new storage block may comprise data that is modifiable (e.g., reduplicated data). When the storage blocks are portions of memory (e.g., memory pages), reference updating module 236 may update multiple separate storage data structures corresponding to the virtual machine, hypervisor, or host operating system. For example, there may be a first storage data structure that corresponds to the host memory and is maintained by the hypervisor and there may be a second storage data structure that corresponds to guest memory of the virtual machine and is maintained by the virtual machine. The host memory may correspond to physical memory (e.g., main memory) of the host and the guest memory may correspond to what appears to the virtual machine as its portion of physical memory (e.g., guest physical memory).

Figure 5:
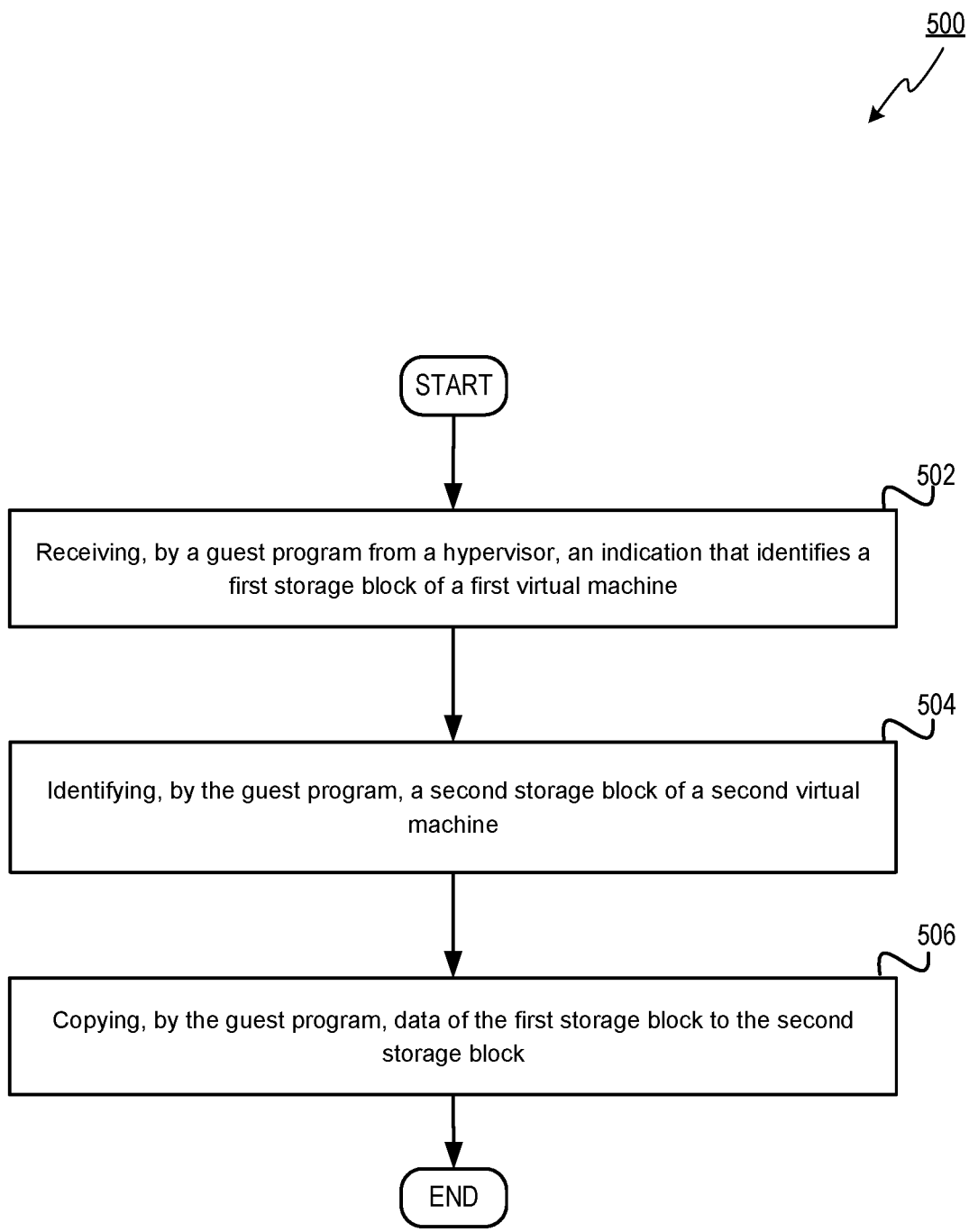
FIG. 5 depicts a flow diagram of an example method that enables a guest program and hypervisor to perform copy on write for encrypted storage of one or more virtual machines, in accordance with one or more aspects of the present disclosure.

FIG. 5 depicts a flow diagram of an illustrative example of a method 500 that enables a guest program and hypervisor to perform copy on write features with encrypted storage of a virtual machine, in accordance with one or more aspects of the present disclosure. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by a virtual machine managed by a hypervisor as shown in FIG. 1.

Method 500 may be performed by processing devices of a server device or a client device and may begin at block 502. At block 502, a guest program executed by a virtual machine may receive an indication from a hypervisor. The indication may identify a first storage block of a first virtual machine that is write protected by the hypervisor. The virtual machine may be unaware that the storage block is write protected and the write protection may stop modifications (e.g., writes) to the storage block without stopping access to the storage block (e.g., reads). The data of the first storage block may be encrypted by a hardware device and the data may be accessible to the guest program in a decrypted form and is inaccessible to the hypervisor in the decrypted form.

The guest program may be executed may a virtual machine managed by the hypervisor. In one example, the guest program may be executed by a third virtual machine and may have access to guest storage of the first virtual machine and guest storage of the second virtual machine. In another example, the guest program may be executed by either the first or second virtual machines and may be configured to access guest storage of the first and second virtual machines. The hypervisor may enable the guest program to access the guest storage of different virtual machines by associating the virtual machine that executes the guest program with a common cryptographic input (e.g., shared VM key) that is used to encrypt or decrypt data of the first and second virtual machines.

At block 504, the guest program may identify a second storage block of a second virtual machine. The first storage block and the second storage block may be encrypted or decrypted by a hardware device using cryptographic keys that are inaccessible to the hypervisor, guest program, or a combination thereof. Each of the cryptographic keys may be based on a combination of a common cryptographic input shared by multiple virtual machines and a location dependent cryptographic input. In one example, the first storage block may be a guest memory page of the first virtual machine and the second storage block may be a guest memory page of a second virtual machine and identifying the second storage block may be in view of an indication from the hypervisor.

At block 506, the guest program may copy data of the first storage block to the second storage block. The data of the first storage block and data of the second storage block may be encrypted using different cryptographic inputs when stored in a storage device. The different cryptographic inputs may include different location dependent cryptographic inputs that correspond to host physical addresses of the first and second storage blocks. Before, during, or after initiation of the copy, the guest program may verify that the second storage block (e.g., destination block) provided by the hypervisor is not in use by any virtual machine or hypervisor processes. In one example, the copying may be performed in response to the processing device receiving a modification for the first storage block and the modification may be applied after the copying to the first storage block (e.g., copy on write (CoW)) or to the second storage block (Redirect-on-write (RoW)). The guest program may then provide an indication to the hypervisor that the copying is complete using one or more hypercalls.

In one example, copying the first storage block to another location may be performed to reverse the effects of data deduplication. The data deduplication may have consolidated multiple storage blocks into the first storage block and the copying may be used to reduplicate the deduplicated data. During deduplication, the guest program may access the content of multiple storage blocks and detect that the first storage block is a duplicate of one or more storage blocks of the second virtual machine. The guest program may provide an indication to the hypervisor to cause the one or more storage blocks to reference a storage location of the first storage block. Responsive to completing the operations described herein above with references to block 506, the method may terminate.

The guest program may perform the copying and enable the hypervisor to implement one or more different enhancements. The enhancements may be provided by the hypervisor and may affect the resources of virtual machines without the virtual machines being aware of the write protecting and/or copying. One enhancement may involve using the write protection and guest program copying to enable the hypervisor to perform data reduplication on primary storage (e.g., main memory), secondary storage (e.g., disk or solid state storage), or a combination thereof. Another enhancement may involve using the write protection and guest program copying to generate snapshots of encrypted storage blocks. This may enable generating snapshots of encrypted guest memory, encrypted virtual machine disks, other storage resource, or a combination thereof. Another enhancement may involve using the write protection and guest program copying to enable the hypervisor to move data between different storage device or moving between different layers of a cache hierarchy (e.g., paging or swapping storage).

Figure 6:
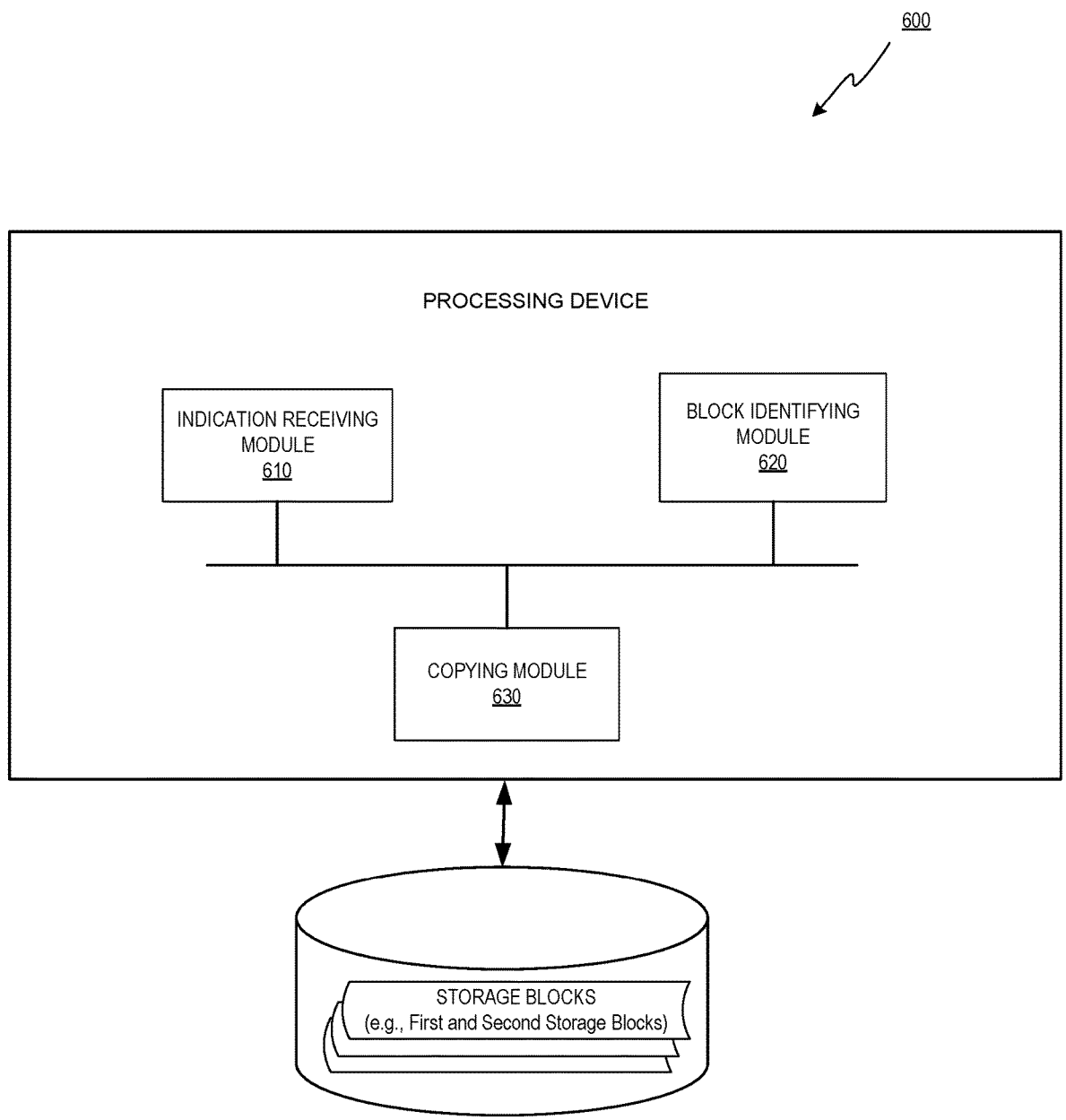
FIG. 6 depicts a block diagram of an example computer system in accordance with one or more aspects of the present disclosure.

FIG. 6 depicts a block diagram of a computer system 600 operating in accordance with one or more aspects of the present disclosure. Computer system 600 may be the same or similar to computer system 100 of FIG. 1 or computer system 800 of FIG. 8 and may include one or more processing devices and one or more memory devices. In the example shown, computer system 600 may include an indication receiving module 610, a block identifying module 620, and copying module 630.

Indication receiving module 610 may enable the processing device to receive an indication of a hypervisor. The indication may identify a first storage block of a first virtual machine that is write protected by the hypervisor. The virtual machine may be unaware that the storage block is write protected and the write protection may stop modifications (e.g., writes) to the storage block without stopping access to the storage block (e.g., reads). The data of the first storage block may be encrypted by a hardware device and the data may be accessible to the guest program in a decrypted form and is inaccessible to the hypervisor in the decrypted form.

The guest program may be executed may a virtual machine managed by the hypervisor. In one example, the guest program may be executed by a third virtual machine and may have access to guest storage of the first virtual machine and guest storage of the second virtual machine. In another example, the guest program may be executed by either the first or second virtual machines and may be configured to access guest storage of the first and second virtual machines. The hypervisor may enable the guest program to access the guest storage of different virtual machines by associating the virtual machine that executes the guest program with a common cryptographic input (e.g., shared VM key) that is used to encrypt or decrypt data of the first and second virtual machines.

Block identifying module 620 may enable the processing device to identify a second storage block of a second virtual machine. The first storage block and the second storage block may be encrypted or decrypted by a hardware device using cryptographic keys that are inaccessible to the hypervisor, guest program, or a combination thereof. Each of the cryptographic keys may be based on a combination of a common cryptographic input shared by multiple virtual machines and a location dependent cryptographic input. In one example, the first storage block may be a guest memory page of the first virtual machine and the second storage block may be a guest memory page of a second virtual machine and identifying the second storage block may be in view of an indication from the hypervisor.

Copying module 630 may enable the processing device to copy data of the first storage block to the second storage block on behalf of the guest program. The data of the first storage block and data of the second storage block may be encrypted using different cryptographic inputs when stored in a storage device. The different cryptographic inputs may include different location dependent cryptographic inputs that correspond to host physical addresses of the first and second storage blocks. Before, during, or after initiation of the copy, the guest program may verify that the second storage block (e.g., destination block) provided by the hypervisor is not in use by any virtual machine or hypervisor processes. In one example, the copying may be performed in response to the processing device receiving a modification for the first storage block and the modification may be applied after the copying to the first storage block (e.g., copy on write (CoW)) or to the second storage block (Redirect-on-write (RoW)). The guest program may then provide an indication to the hypervisor that the copying is complete using one or more hypercalls.

In one example, copying the first storage block to another location may be performed to reverse the effects of data deduplication. The data deduplication may have consolidated multiple storage blocks into the first storage block and the copying may be used to reduplicate the deduplicated data. During deduplication, the guest program may access the content of multiple storage blocks and detect that the first storage block is a duplicate of one or more storage blocks of the second virtual machine. The guest program may provide an indication to the hypervisor to cause the one or more storage blocks to reference a storage location of the first storage block.

Figure 7:
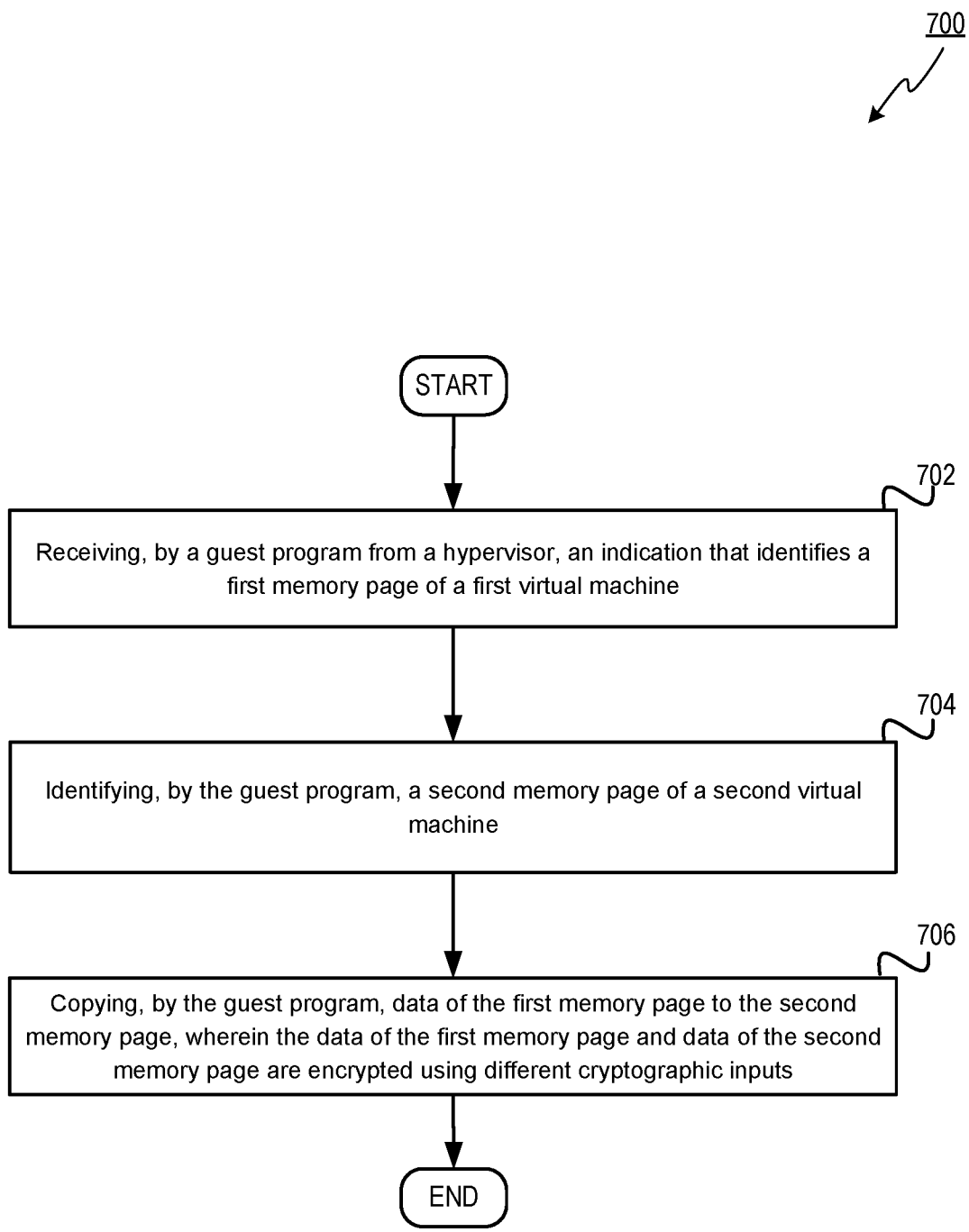
FIG. 7 depicts a flow diagram of an example method that enables a guest program and hypervisor to perform copy on write for encrypted memory of one or more virtual machines, in accordance with one or more aspects of the present disclosure.

FIG. 7 depicts a flow diagram of one illustrative example of a method 700 for performing data deduplication of a storage device while the data on the storage device is encrypted, in accordance with one or more aspects of the present disclosure. Method 700 may be similar to method 500 and may be performed in the same or a similar manner as described above in regards to method 500. Method 700 may be performed by processing devices of a server device or a client device and may begin at block 702.

At block 702, a guest program executed by a virtual machine may receive an indication from a hypervisor. The indication may identify a first memory page of a first virtual machine that is write protected by the hypervisor. The virtual machine may be unaware that the memory page is write protected and the write protection may stop modifications (e.g., writes) to the memory page without stopping access to the memory page (e.g., reads). The data of the first memory page may be encrypted by a hardware device and the data may be accessible to the guest program in a decrypted form and is inaccessible to the hypervisor in the decrypted form.

The guest program may be executed may a virtual machine managed by the hypervisor. In one example, the guest program may be executed by a third virtual machine and may have access to guest memory of the first virtual machine and guest memory of the second virtual machine. In another example, the guest program may be executed by either the first or second virtual machines and may be configured to access guest memory of the first and second virtual machines. The hypervisor may enable the guest program to access the guest memory of different virtual machines by associating the virtual machine that executes the guest program with a common cryptographic input (e.g., shared VM key) that is used to encrypt or decrypt data of the first and second virtual machines.

At block 704, the guest program may identify a second memory page of a second virtual machine. The first memory page and the second memory page may be encrypted or decrypted by a hardware device using cryptographic keys that are inaccessible to the hypervisor, guest program, or a combination thereof. Each of the cryptographic keys may be based on a combination of a common cryptographic input shared by multiple virtual machines and a location dependent cryptographic input. In one example, the first memory page may be a guest memory page of the first virtual machine and the second memory page may be a guest memory page of a second virtual machine and identifying the second memory page may be in view of an indication from the hypervisor.

At block 706, the guest program may copy data of the first memory page to the second memory page. The data of the first memory page and data of the second memory page may be encrypted using different cryptographic inputs when stored in a storage device. The different cryptographic inputs may include different location dependent cryptographic inputs that correspond to host physical addresses of the first and second memory pages. Before, during, or after initiation of the copy, the guest program may verify that the second memory page (e.g., destination block) provided by the hypervisor is not in use by any virtual machine or hypervisor processes. In one example, the copying may be performed in response to the processing device receiving a modification for the first memory page and the modification may be applied after the copying to the first memory page (e.g., copy on write (CoW)) or to the second memory page (Redirect-on-write (RoW)). The guest program may then provide an indication to the hypervisor that the copying is complete using one or more hypercalls.

In one example, copying the first memory page to another location may be performed to reverse the effects of data deduplication. The data deduplication may have consolidated multiple memory pages into the first memory page and the copying may be used to reduplicate the deduplicated data. During deduplication, the guest program may access the content of multiple memory pages and detect that the first memory page is a duplicate of one or more memory pages of the second virtual machine. The guest program may provide an indication to the hypervisor to cause the one or more memory pages to reference a storage location of the first memory page. Responsive to completing the operations described herein above with references to block 706, the method may terminate.

Figure 8:
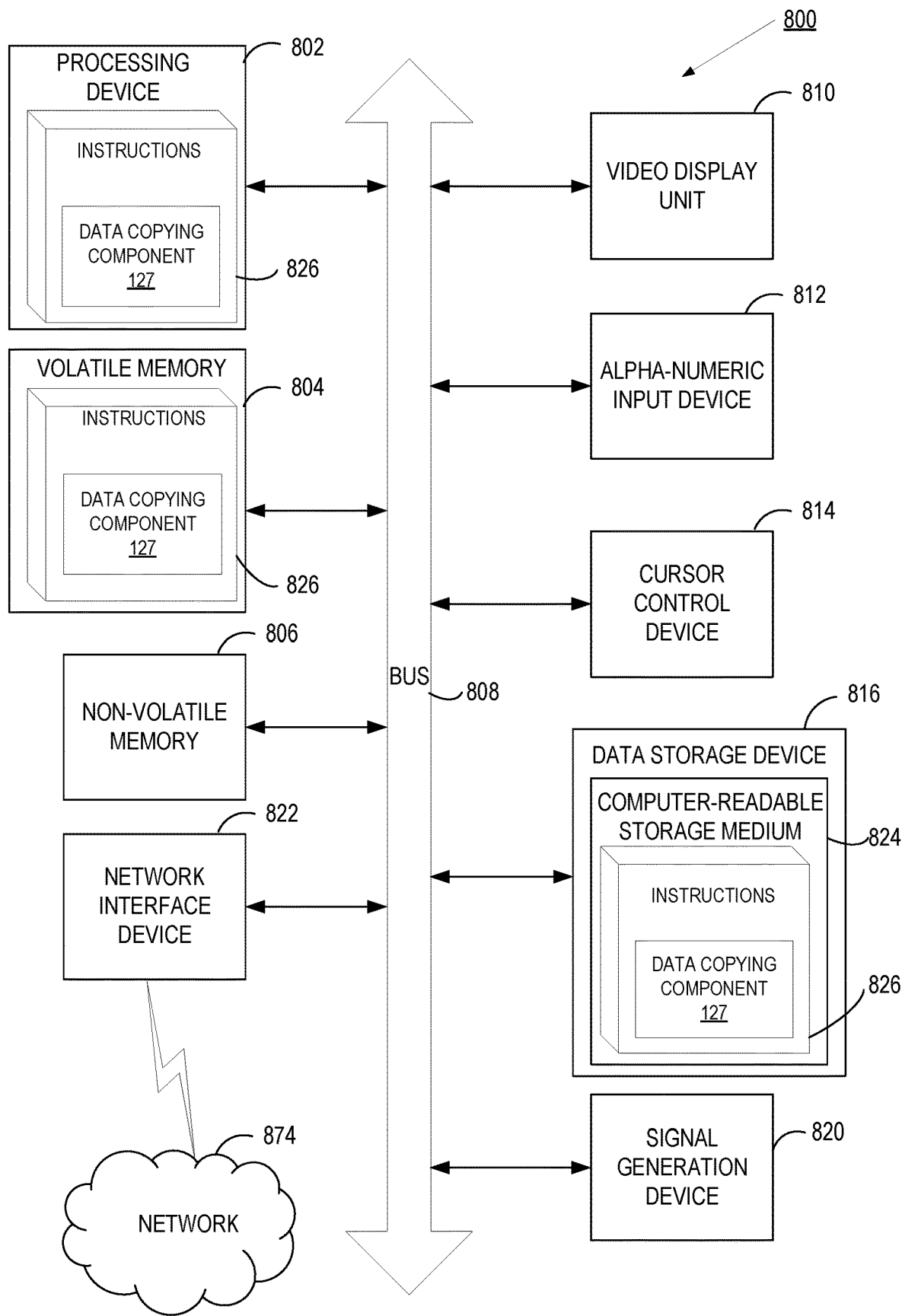
FIG. 8 depicts a block diagram of an illustrative computing device operating in accordance with the examples of the present disclosure.

FIG. 8 depicts a block diagram of a computer system operating in accordance with one or more aspects of the present disclosure. In various illustrative examples, computer system 800 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for implementing methods 500 or 700 and for encoding data copying component 127 of FIGS. 1 and 2.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a guest program from a hypervisor, an identifier of a first storage block of a first virtual machine, wherein the first storage block is write protected by the hypervisor;
   identifying, by the guest program, a second storage block of a second virtual machine;
   receiving, by the guest program, a modification request for the first storage block;
   in response to receiving the modification request for the first storage block, copying, by the guest program, data of the first storage block to the second storage block, wherein the data of the first storage block and data of the second storage block are encrypted using different cryptographic inputs and wherein the copying includes:
      decrypting, the first storage block to the second storage block, by a hardware device that is in communication with the guest program, using cryptographic keys, wherein each of the cryptographic keys is based on a common cryptographic input shared by multiple virtual machines and a location dependent cryptographic input, wherein the cryptographic keys are inaccessible to the hypervisor;
   in response to copying the data of the first storage block to the second storage block, applying, by the guest program, the modification request to the data of the second storage block; and
   notifying, by the guest program, the hypervisor of completion of the copying.

2. The method of claim 1, wherein the guest program is executed by a third virtual machine and has access to guest storage of the first virtual machine and guest storage of the second virtual machine.

3. The method of claim 1, wherein the data of the first storage block is encrypted by a hardware device and the data is accessible to the guest program in a decrypted form and is inaccessible to the hypervisor in the decrypted form.

4. The method of claim 1, wherein the different cryptographic inputs comprise different location dependent cryptographic inputs that correspond to host physical addresses of the first and second storage blocks.

5. The method of claim 1, wherein the first storage block is a guest memory page of the first virtual machine and the second storage block is a guest memory page of a second virtual machine.

6. The method of claim 1, further comprising verifying, by the guest program, that the second storage block provided by the hypervisor is not in use by a virtual machine.

7. The method of claim 1, wherein the identifier of the first storage block comprises a guest physical memory address of a deduplicated memory page and the copying reduplicates the deduplicated memory page.

8. The method of claim 1, further comprising:
   detecting, by the guest program, that the first storage block is a duplicate of one or more storage blocks of the second virtual machine; and
   providing, by the guest program, an indication to the hypervisor to cause the one or more storage blocks to reference a storage location of the first storage block.

9. A system comprising:
   a memory;
   a processing device communicably coupled to the memory, the processing device to:

receive, by a guest program from a hypervisor, an identifier of a first storage block of a first virtual machine, wherein the first storage block is write protected by the hypervisor;

identify, by the guest program, a second storage block of a second virtual machine;

receive, by the guest program, a modification request for the first storage block;

in response to receiving the modification request for the first storage block, copying, by the guest program, data of the first storage block to the second storage block, wherein the data of the first storage block and data of the second storage block are encrypted using different cryptographic inputs and wherein the copying includes:

decrypting, the first storage block to the second storage block, by a hardware device that is in communication with the guest program, using cryptographic keys, wherein each of the cryptographic keys is based on a common cryptographic input shared by multiple virtual machines and a location dependent cryptographic input, wherein the cryptographic keys are inaccessible to the hypervisor;

in response to copying the data of the first storage block to the second storage block, apply, by the guest program, the modification request to the data of the second storage block; and notify, by the guest program the hypervisor of completion of the copying.

10. The system of claim 9, wherein the guest program is executed by a third virtual machine and has access to guest storage of the first virtual machine and guest storage of the second virtual machine.

11. The system of claim 9, wherein the data of the first storage block is encrypted by a hardware device and the data is accessible to the guest program in a decrypted form and is inaccessible to the hypervisor in the decrypted form.

12. The system of claim 9, wherein the different cryptographic inputs comprise different location dependent cryptographic inputs that correspond to host physical addresses of the first and second storage blocks.

13. A non-transitory machine-readable storage medium storing instructions which, when executed, cause a processing device to perform operations comprising:

receiving, by a guest program from a hypervisor, an identifier of a first storage block of a first virtual machine, wherein the first storage block is write protected by the hypervisor;

identifying, by the guest program, a second storage block of a second virtual machine;

receiving a modification request for the first storage block;

in response to receiving the modification request for the first storage block, copying, by the guest program, data of the first storage block to the second storage block, wherein the data of the first storage block and data of the second storage block are encrypted using different cryptographic inputs and wherein the copying includes:

decrypting, the first storage block to the second storage block, by a hardware device that is in communication with the guest program, using cryptographic keys, wherein each of the cryptographic keys is based on a common cryptographic input shared by multiple virtual machines and a location dependent cryptographic input, wherein the cryptographic keys are inaccessible to the hypervisor;

in response to copying the data of the first storage block to the second storage block, applying, by the guest program, the modification request to the data of the second storage block; and notifying, by the guest program, the hypervisor of completion of the copying.

14. The non-transitory machine-readable storage medium of claim 13, wherein the guest program is executed by a third virtual machine and has access to guest storage of the first virtual machine and guest storage of the second virtual machine.

15. The non-transitory machine-readable storage medium of claim 13, wherein the data of the first storage block is encrypted by a hardware device and the data is accessible to the guest program in a decrypted form and is inaccessible to the hypervisor in the decrypted form.

16. The non-transitory machine-readable storage medium of claim 13, wherein the different cryptographic inputs comprise different location dependent cryptographic inputs that correspond to host physical addresses of the first and second storage blocks.

* * * * *